United States Patent [19]

Totani

[11] Patent Number: 4,660,868

[45] Date of Patent: Apr. 28, 1987

[54] FLUID COUPLING HAVING HIGH SEALABILITY

[75] Inventor: Tatuo Totani, Yokohama, Japan

[73] Assignee: Toyoko Kagaku Co., Ltd., Kanagawa, Japan

[21] Appl. No.: 804,162

[22] Filed: Dec. 3, 1985

Related U.S. Application Data

[63] Continuation-in-part of Ser. No. 654,953, Sep. 27, 1984, abandoned.

[30] Foreign Application Priority Data

May 7, 1984 [JP] Japan ................................. 59-89502
May 26, 1984 [JP] Japan ................................. 59-105681

[51] Int. Cl.⁴ .......................................... F16L 19/02
[52] U.S. Cl. .................................... 285/354; 285/328
[58] Field of Search ............... 285/354, 353, 384, 386, 285/385

[56] References Cited

U.S. PATENT DOCUMENTS

| 2,208,353 | 7/1940 | Woolley et al. | 285/354 X |
| 2,452,430 | 10/1948 | Clark et al. | 285/276 X |
| 2,937,891 | 5/1960 | Gressel | 285/328 X |
| 3,267,398 | 8/1966 | Van Iperen et al. | 285/328 X |
| 3,314,695 | 4/1967 | Perry | 285/276 X |
| 3,420,497 | 1/1969 | Wilcox | 285/277 X |
| 4,427,222 | 1/1984 | Abbes et al. | 285/353 |

FOREIGN PATENT DOCUMENTS 518930 3/1940 United Kingdom ................ 285/281

Primary Examiner—Thomas F. Callaghan
Attorney, Agent, or Firm—Huff & Hanson

[57] ABSTRACT

Disclosed is a cap-nut fluid type coupling wherein piping welded to said coupling is less liable to twist or does not twist at all when the cap nut is tightened. The fluid joint coupling for clamping the cap nut has a ring-shaped groove formed on the contacting surface of the sleeve with the cap nut to rotatably hold the small spheres in the groove.

5 Claims, 9 Drawing Figures

PRIOR ART

FLUID COUPLING HAVING HIGH SEALABILITY

CROSS-REFERENCES TO RELATED APPLICATIONS

This application is a continuation-in-part of application Ser. No. 654, 953, filed on Sept. 27, 1984 now abandoned.

BACKGROUND OF THE INVENTION

The present invention relates to a cap nut fluid coupling characterized by a high degree of sealability and ease of fitting the coupling to associated piping.

The rapid advance of high technology in recent years has made it necessary, as seen in the case of VLSI or super VLSI, to manufacture extremely large scale integrated circuits. In the manufacture of such an extremely large scale integrated circuit, a highly toxic fluid-gas such as gallium arsenide (GaAs), a semi-conductor compound, is employed and a high-purity film is formed under extremely high vacuum conditions. For these reasons, it is obvious that the semi-conductor manufacturing equipment must possess a high degree of sealability.

All the flow-path elements for such equipment generally cannot be interconnected by welding, at lease some have to be interconnected mechanically. As a consequence, a fluid coupling with excellent mechanical sealability is an indispensible element for such equipment. For this purpose, there are a wide variety of fluid couplings available. A typical fluid coupling, as is illustrated in FIG. 1, consists of two sleeves 1 and 2 connected by means of a gasket 3, the connection being effected by screwing an externally threaded gland 4 carried by sleeve 1 into a cap nut 5 carried by sleeve 2. Such a connection using a cap nut, a connection which is quite simple and does not require a large amount of space, is primarily used for connecting pipes of small diameter. This means of connection, however, has several drawbacks. For example, when the cap nut is tightened, a torque due to friction between the cap nut 5 and the sleeve 2 acts on the sleeve and, as a consequence, the piping welded to the sleeve is twisted. Another drawback is that a rotation of the sleeve causes scratches on the surface of the gasket 3 which may result in leakage of fluid. To eliminate these drawbacks, it is common practice to provide chamfers 6 of two sides of the sleeve 2 by pressing a spanner against the chamfered sides. This task of tightening the cap nut 5, however, cannot be accomplished by a single worker since the worker must rotate the cap nut while at the same time immovably holding both the gland 4 and the sleeve 2. In addition, the task must be done with great care which makes assembly of the fluid coupling very inefficient.

Another conventional joint for preventing integral rotation fixedly interposes a ball 8 and a nut 9 between a sleeve and 7 and a screwed locking ring 10 by placing the ball 8 on the sleeve 7, covering the nut 9 thereon, engaging and welding the ring 10 to the sleeve 7. Such a joint is shown in FIG. 2 and is disclosed in G.B. Patent No. 518,930.

Since this conventional joint has a number of parts in a complicated structure and also has the problem of thermal influence during welding, the joint has the drawbacks that the assembly is very complicated and the joint cannot be simply used as an independent part. Thus, the joint has the disadvantages that it is inconvenient in the actual use and its available range is quite limited.

SUMMARY OF THE INVENTION

A primary object of the present invention is to provide a cap-nut fluid coupling constructed such that when the cap nut is tightened, the piping welded to the fluid coupling is less likely to twist or is free from twisting.

Another object of this invention is to provide a fluid joint coupling which does not need to suppress spheres in a simple structure, is independent as a part and does not require other tasks such as assembling.

Another object of the present invention is to provide a cap-nut fluid coupling constructed such that there is no possibility of the gasket being scratched or broken, no matter to what extent the cap nut might be tightened.

Still another object of the present invention is to provide a cap nut fluid coupling having an extremely high degree of sealability.

DETAILED DESCRIPTION OF THE INVENTION

This invention relates to a fluid joint coupling comprising tubular body formed with a threaded portion on the outer periphery of one end, a tubular sleeve provided with a short ring-shaped portion on the outer periphery of the end communicating with a through hole of the body at the threaded portion of the body, a gasket between the body and the sleeve, a cap nut engaged with the sleeve for engaging with the threaded portion of the body to rigidly clamp the body and the sleeve, and a ring-shaped groove formed on the contacting surface of the sleeve with the cap nut of the short ring-shaped portion and a number of small spheres being rotatably held in the groove.

An embodiment of the present invention is described hereinafter with reference to the attached drawings.

Figure 1:
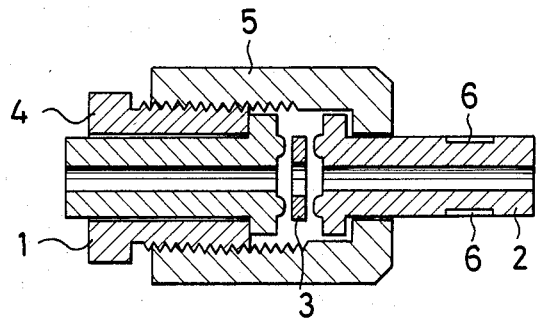
FIGS. 1 and 2 are cross-sectional views showing conventional fluid couplings.
Figure 2:
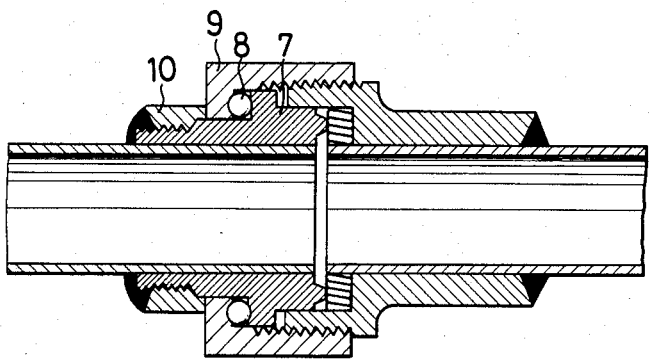
Figure 3:
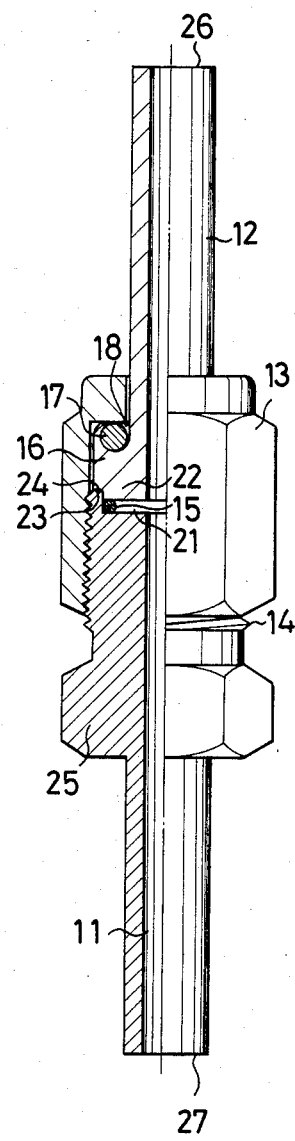
FIG. 3 is a partially sectioned side view of one embodiment of the invention.

In FIG. 3, the fluid coupling shown comprises body 11, sleeve 12, and cap nut 13, the cap nut fitting about the sleeve. The body 11 has a central through hole and at one end is provided with an externally threaded portion 14 as well as a polygonal projection 25 adjacent to the threaded portion 14, the sleeve 12 being fastened to the body 11 with a gasket 15 interposed between the sleeve and the body. The sleeve 12 has a central through hole and, externally at its end, has an outwardly projecting short annular portion 16. On the surface of the short annular portion 16 which presses against the cap nut 13 is a ring groove 18, as is shown in FIG. 4, holding numerous small spheres 17 which function collectively as rotating means.

Figure 4:
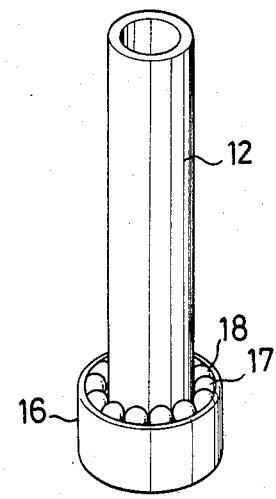
FIG. 4 an perspective view of a sleeve according to the present invention.
Figure 6:
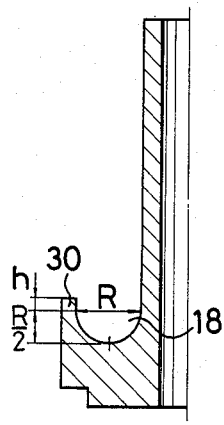
FIG. 6 is a cross-sectional view of a sleeve according to the present invention.
Figure 7:
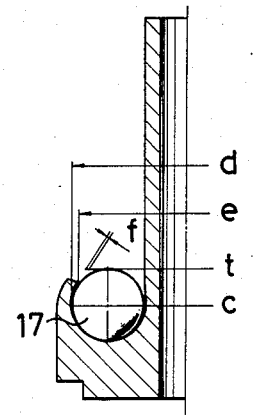
FIG. 7 is a cross-sectional showing the structure of for holding the spheres in the sleeve according to the present invention.
Figure 8:
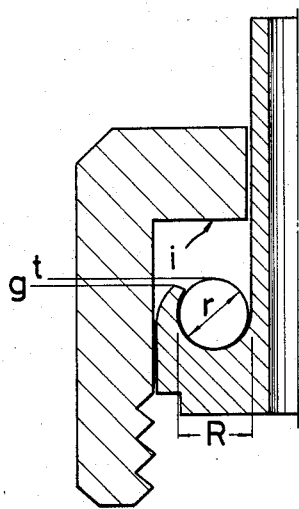
FIG. 8 is a cross-sectional view showing the structure for engaging cap nut with a sleeve of the invention.
Figure 9:
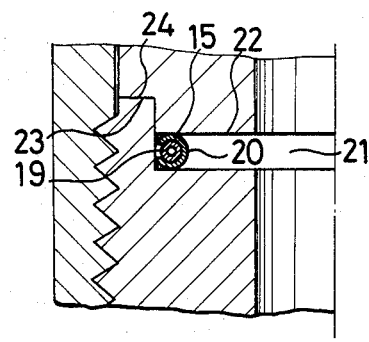
FIG. 9 is an enlarged, cross-sectional view of the interface between the body and the sleeve of FIG. 3.

In the manufacture of the sleeve 12 for holding the small spheres 17 of this invention as shown in FIG. 4, the ring-shaped semicircular groove on the sleeve has, as is shown in FIG. 6, a diameter R slightly larger than the diameter r of the sphere and the outer peripheral wall 30 of the groove projects a distance equal to h plus R/2 from the bottom of the groove. Then, as is shown in FIG. 7, after the small spheres 17 having a diameter r are placed within the groove 18, the upper end of the wall 30 is formed in a rounded shape toward the inside of the groove to retain the small spheres 17 therein. The upper end of the wall 30 is precisely formed so that the end of the wall after forming is disposed in a position between the horizontal center line c of the sphere and the top t of the ball and on a line e inwardly spaced from line d extending from the outer peripheral surface of the sphere parallel to the vertical of the sphere axis. The end of wall 30 does not contact sphere on the inward side so as to form a small gap f. The formed end 30 is on the horizontal line g downwardly spaced from the head t of the sphere. Thus, as shown in FIG. 8, the small spheres 17 are contacted only on head t by the cap nut i and by essentially the bottom of the groove so that the spheres can freely rotate.

In the embodiment described above, the ring-shaped groove 18 is formed with a semi-circular cross-section. However, the groove 18 may be formed in a semi-elliptical or semi-rectangular shape. However, it is preferable to form the groove 18 in a rounded type shape such as in the semi-circular or semi-elliptical shape for reasons of strength. Furthermore, the upper end of the outer peripheral wall 30 need not particularly be formed in a rounded type shape, but it must be formed to rotatably hold the spheres.

In the present invention as described above, since the ring-shaped groove 18 contains and retains a number of small spheres, the cap nut 13 and the sleeve 12 can idly rotate even if rotary torque is applied to the sleeve when the cap nut is engaged with the threaded portion 14 of the body, and a force greater than a predetermined value is not applied to the sleeve 12.

To assemble the fluid coupling in a network of pipes, the end of the sleeve and the end of the body are welded to the piping so that a fluid path is formed between points 26 and 27.

Figure 5:
FIG. 5 is a partial fragmentary view of a gasket according to the present invention.

The gasket 15 employed in the above described embodiments may be a coil spring 19 which is formed in a circle by linking the two ends of a relatively fine spiral coil spring which is confined with metallic material 20, leaving the center of the exterior open as is illustrated in FIG. 5. The coil spring may be made of stainless steel or Inconel, while the confining material may be aluminum, nickel, copper or Monel metal.

It should be understood that in the present invention, not only the above-mentioned gasket but also a conventional metallic 0-ring or C-ring may be employed as gasket 15. The use of the above-mentioned gasket which internally holds a coil spring, however, will assure a high degree of sealability since such a gasket is far more elastic than a metallic 0-ring or C-ring and thus the gasket can strongly resist a pressure acting upon it.

For the purpose of further enhancing the performance of a fluid coupling as previously described, in the above-mentioned embodiment an annular recess may be provided at the end of the threaded portion 14 of the body 11, while a projection 22 matching the recess 21 may be provided at the surface of the sleeve 12 which adjoins the gasket 15.

The gasket thus fits into the recess 21 and bears against the projection 22. The depth of the recess 21 and the height of the projection 22 are designed such that, when the gasket is pressed to the effective limit of its elastic compressibility, the stepped portion 23 of the projection 22 may bear against the end 24 of the recess 21.

In conventional fluid couplings, the effective compression of the gasket is indicated in terms of the number of nut-tightening turns. However, this number of turns required is, in practice, variable depending upon the installed position and/or the material quality of the gasket. Consequently, an emphasis on leak-tightness for the fluid coupling may result in the nut being excessively tightened which may cause scratching or even breaking of the gasket. Even the slightest damage to the gasket will cause deterioration of the sealability of the fluid coupling. In the above embodiment where the stepped portion of the projection prevents the gasket from being compressed beyond its effective compressibility, the gasket is free from the conventional danger of damage. Furthermore, since the engaging projection is engaged within the engaging recess, centering can be easily performed, and high fluid tightness can thus be maintained.

As described above, the embodiment of the fluid coupling of the present invention which employs a special gasket, excels in sealability and this excellence of sealability can be drastically enhanced by roll-burnishing the sealing faces where the body and the sleeve come into contact adjacent the gasket.

For instance, the sealing faces of the above-mentioned fluid coupling may be turned and finished to a surface roughness of 3.2 S followed by a roll-burnishing operation. Then a 1-2 second roll-burnishing treatment will easily yield a mirror finish about 1.0S-0.8S. A fluid coupling thus treated acquires an outstanding sealability of $10^{-10}$ atm-cc/sec in terms of helium leakage rate and such a fluid coupling can easily installed, even by a non-skilled worker.

The fluid tightness is improved by the roll burnishing process as described above because, not only is a smooth mirror-polished surface obtained by the roll burnishing process, but, in addition, the surface hardness is improved by the roll burnishing process.. For example, in the case of stainless steel, a material having a hardness of 180 HB is hardened by the roll burnishing to 300 HB or higher. As a consequence, the formation of ultrafine linear scratches which can cause deterioration of the fluidtightness of the gasket is minimized.

It is claimed:

1. A high sealability cap-nut fluid coupling for an apparatus for manufacturing a semiconductor, the coupling comprising a tublar body having a threaded portion on the outer periphery of one end, a tubular sleeve having a short ring-shaped groove portion on the outer periphery of one end which communicates with a through hole of the body at the threaded portion of the body, a gasket between the body and the sleeve, a cap nut engaged with the sleeve for engaging with the threaded portion of the body to rigidly clamp the body and the sleeve, and a ring-shaped groove formed on the contacting surface of the sleeve with the cap nut of the short ring-shaped portion and with a number of small spheres rotatably held in the groove, the upper end of the outer peripheral wall of the ring-shaped groove being formed substantially longer than the radius of the small spheres, and once the small spheres are engaged within the groove, the upper end of the outer peripheral wall being formed inwardly to rotatably maintain the small spheres in the sleeve.

2. A cap nut fluid coupling according to claim 1, wherein, at the surfaces where the body and the sleeve contact with said gasket, a recess and a projection to match said recess are provided such that the end of said recess fits a stepped portion of said projection, thereby preventing the gasket from being compressed beyond its effective limit of elastic compressability.

3. A cap nut fluid coupling according to claim 1, wherein the gasket is a ring-shaped coil spring confined by a metal material having a C-shaped cross section.

4. A cap nut fluid coupling according to claim 3, wherein the surfaces of the body and the sleeve which contact with said gasket are roll-burnished surfaces.

5. A coupling according to claim 1, wherein each sphere has a diameter r, the ring-shaped groove has a width R slightly larger than the diameter r of the sphere, and the outer peripheral wall of the groove projects a distance equal to h plus R/2 from the bottom of the groove, and after the small spheres having a diameter r are placed within the groove, the upper end of the outer peripheral wall is formed in a rounded shaped toward the inside of the groove to retain the small spheres therein.

* * * * *